(No Model.) 2 Sheets—Sheet 1.

W. R. SWIFT & T. GORDON.
REGENERATIVE BURNER.

No. 579,687. Patented Mar. 30, 1897.

Witnesses:

Inventors
William R. Swift
Thomas Gordon
By their Attorney (No Model.) 2 Sheets—Sheet 2.

W. R. SWIFT & T. GORDON.
REGENERATIVE BURNER.

No. 579,687. Patented Mar. 30, 1897.

Witnesses:—

Inventors
William R. Swift
Thomas Gordon
By their Attorney

UNITED STATES PATENT OFFICE.

WILLIAM R. SWIFT AND THOMAS GORDON, OF NEW YORK, N. Y., ASSIGNORS TO THE GORDON-MITCHELL GAS LAMP COMPANY, OF SAME PLACE.

REGENERATIVE BURNER.

SPECIFICATION forming part of Letters Patent No. 579,687, dated March 30, 1897.

Application filed April 13, 1893. Serial No. 470,201. (No model.)

*To all whom it may concern:*

Be it known that we, WILLIAM R. SWIFT and THOMAS GORDON, of the city, county, and State of New York, have invented a new and useful Improvement in Regenerative Burners, of which the following is a specification.

We will describe a regenerative burner embodying our improvement, and then point out the novel features in a claim.

Figure 1:
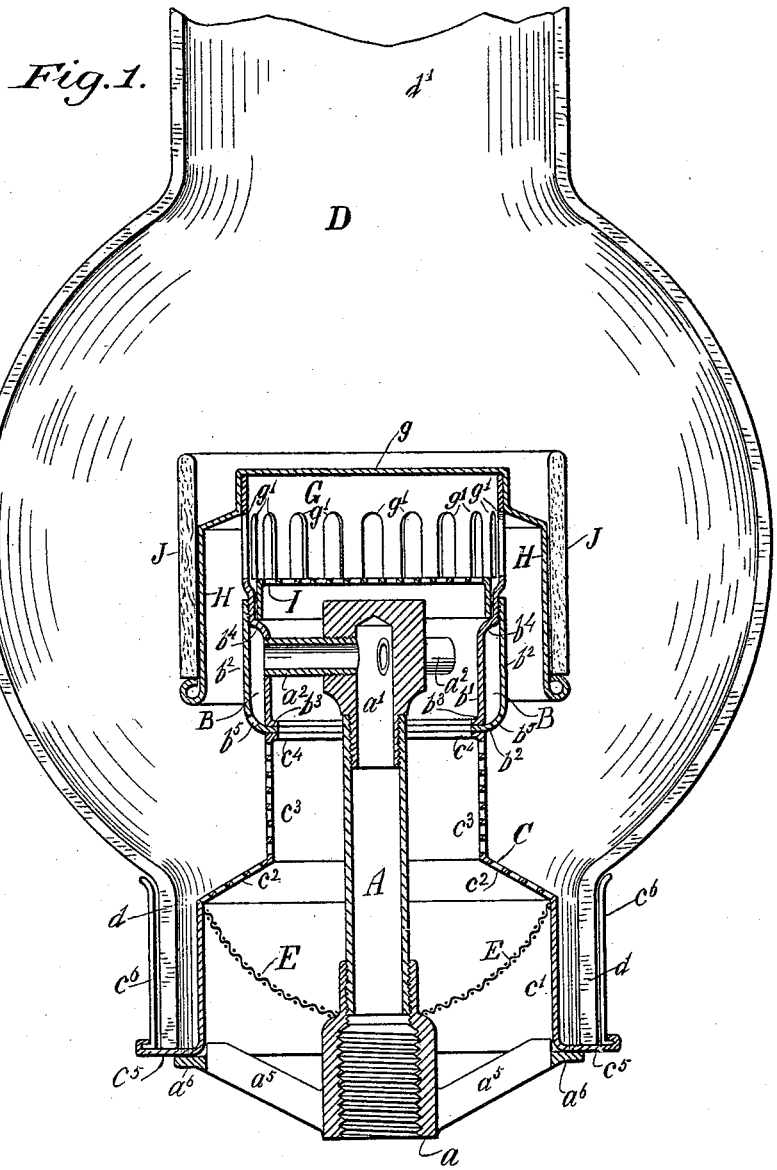
Figure 2:
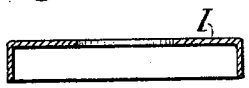
Figure 3:
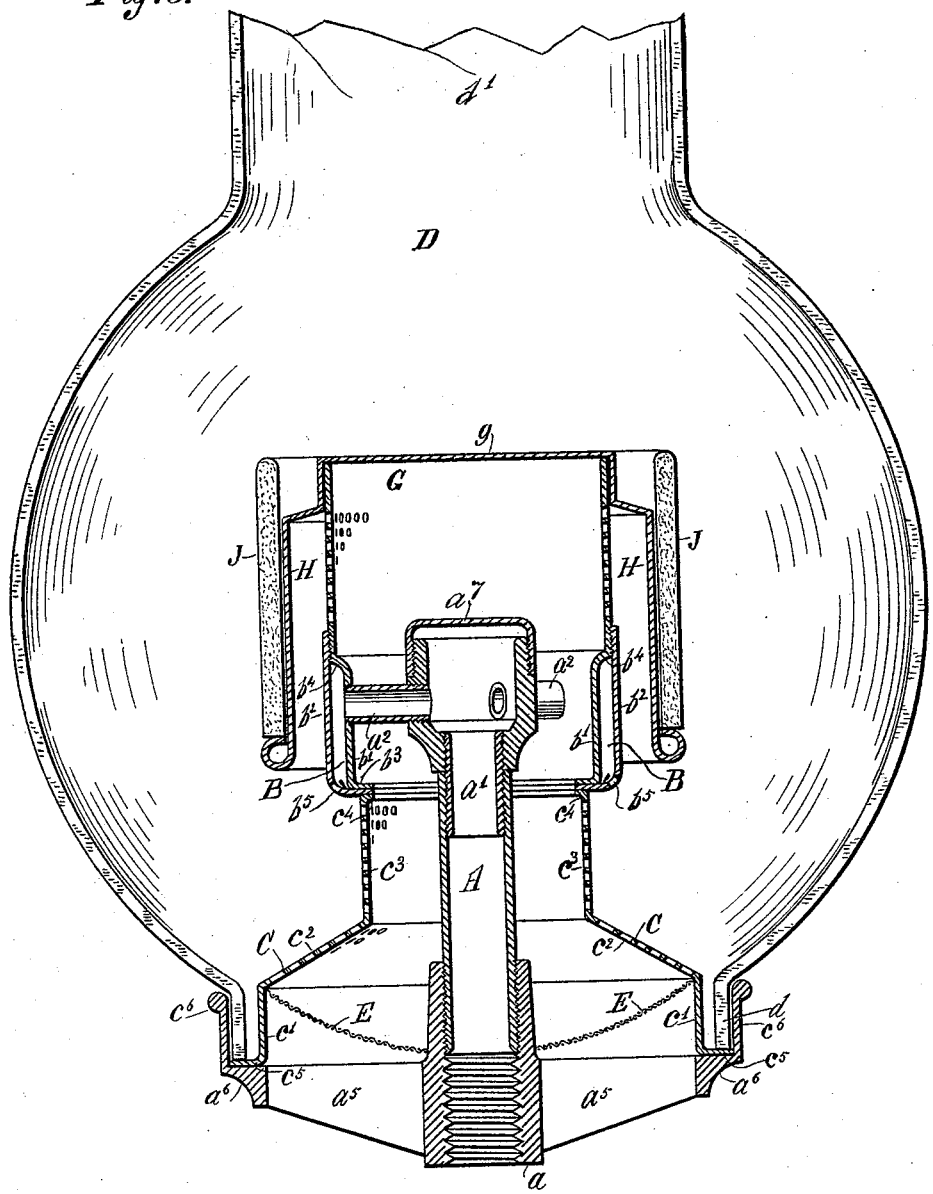

In the accompanying drawings, Figure 1 is a central vertical section of a regenerative lamp and burner, the latter of which embodies our improvement. Fig. 2 is a central vertical section of a diaphragm of modified form. Fig. 3 is a central vertical section of a regenerative lamp somewhat modified in construction.

Similar letters of reference designate corresponding parts in all the figures.

Referring first to Fig. 1, A designates a gas-conduit, here shown as made in the form of a pipe, provided at its lower end with a screw-coupling $a$, capable of engagement with the nipple of a gas-fixture.

At the top of the gas-conduit A is a central gas-chamber $a'$, here shown as made in the form of a cap or hollow plug, whence extend radially a number of tubes $a^2$, which serve to supply the gas to a gas-chamber B.

The gas-chamber B is of annular form, it being in the present instance made of two sheet-metal shells $b'$ $b^2$. The inner shell $b'$ is engaged with the tubes $a^2$. A convenient way of engaging the tubes $a^2$ with the cap or plug $a'$ is to provide the parts with screw-threads on their adjacent surfaces. The ends of the tubes which support the shell $b'$ may be united with said shell by brazing. The lower edge of the shell $b'$ is turned inwardly in the form of a flange $b^3$. That portion of the shell $b'$ forming the upper portion of the gas-chamber B is turned outwardly to form a shoulder $b^4$. Above this shoulder the shell $b^2$ engages with the shell $b'$, the means of engagement here represented being screw-threads. At the lower extremity the shell $b^2$ is bent inwardly to lap under the flange $b^3$ of the shell $b'$. The lower portion of the shell $b^2$ is provided with perforations $b^5$, whence the gas issues in jets and is burned.

C designates a shell through which passes air necessary for combustion. It may be made of sheet metal, and, as here shown, it has a lower cylindric portion $c'$, a contracted conical portion $c^2$, and a smaller cylindrical portion $c^3$. The upper extremity of the latter is turned inwardly to form a flange $c^4$, and this may bear against the inwardly-turned lower edge of the shell $b^2$, comprised in the gas-chamber.

We have shown the lower cylindric portion $c'$ of the shell C as provided with an integral outwardly-extending flange $c^5$, forming a gallery or support for a combustion-chamber, which in the present example of our improvement is made in the form of a glass globe D, provided with a cylindrical base portion $d$, that loosely surrounds the lower cylindric portion $c'$ of the shell C, and surmounted by a cylindric portion $d'$. Spring-fingers $c^6$, extending upwardly from the gallery-flange $c^5$, impinge against the outer side of the cylindric base portion $d$ of the combustion-chamber D, thereby holding the same in place.

A convenient means of supporting the shell C, and consequently the combustion-chamber, consists in arms $a^5$, extending outwardly from the coupling $a$ to a ring $a^6$, upon which the flange or gallery $c^5$ rests.

Preferably we employ in the lower part of the shell C a perforated or reticulated diaphragm E, so as to prevent air ascending in gusts. Part of the air escapes from the perforations in the shell C, so as to supply air to the lower mantle or surface of the flame. Another portion of the air flows upwardly past the tubes $a^2$, to support the combustion on the upper mantle or surface of the flame. This portion of the air passes through the air-chamber G, and thence to a deflector H, whereby air is directed against the flame.

The chamber G, as here shown, is formed partly by the cylindric upper portion of the shell $b'$, forming part of the gas-chamber B, and partly by a cap $g$, surmounting said shell. The upper portion of the shell $b'$ is shown as vertically slotted, and hence as being provided with a number of upright arms between the slots $g'$. The cap $g$ may be made of sheet metal and integral with the deflector H.

When the chamber G is constructed in the manner described, it will be advantageous to introduce a diaphragm I, having numerous small perforations below the slots or openings $q'$. As here shown, the diaphragm I is provided with a downwardly-extending rim, fitting inside of the shell $b'$ and resting upon an outwardly-turned portion of the latter.

We may use a reflector J, consisting of an annular shell around the deflector H and resting upon an outwardly-turned flange or bead on the lower extremity of the latter.

In Fig. 2 we have shown that the diaphragm I instead of having a number of perforations may be provided with a single central opening. Each form has advantages for a particular kind of gas.

In Fig. 3 the construction is substantially the same as that described in connection with Fig. 1, excepting as to some features which we will now describe. The central gas-chamber $a'$ at the upper extremity of the gas-conduit $A'$ has a cap $a^7$. This may be made with a downwardly-extending rim capable of screwing into the upper portion of the body.

Instead of having large openings for the escape of air from the air-heating chamber G, the form of our invention illustrated by Fig. 3 has a number of perforations, it thus being enabled to regulate of itself the escape of the air, instead of requiring the diaphragm I for that purpose.

What we claim as our invention, and desire to secure by Letters Patent, is—

In a regenerative burner, the combination of a nipple for connecting with a gas-fixture, a gas-supply pipe extending upwardly therefrom, an annular upwardly-extended gas-burner chamber, concentric with the gas-supply pipe and provided with a circular row of gas-outlets opening downwardly at its base, an air-deflector extending downwardly and surrounding the gas-burner chamber and separated a distance therefrom for the passage of air, a diaphragm separating the space between the outer surface of the gas-burner chamber and the deflector from the space through the annular gas-burner chamber, a globe-support below the burner and concentric with and sustained by the gas-supply pipe, a globe supported by the globe-support, and a shell surrounding the gas-supply pipe and extending from the globe-support to the base portion of the annular burner-chamber, inward of its row of gas-outlets so as to form with the inner wall of the gas-burner chamber part of a conduit to the annular space between the deflector and the burner-chamber, said shell having perforations for supplying air to the base of the burner, substantially as specified.

In testimony whereof we have signed our names to this specification in the presence of two subscribing witnesses.

WILLIAM R. SWIFT.
THOMAS GORDON.

Witnesses:
ANTHONY GREF,
WILLIAM M. ILIFF.